Oct. 27, 1942.   L. SPRARAGEN   2,299,955
WEATHER STRIP AND METHOD OF MAKING THE SAME
Filed July 5, 1940
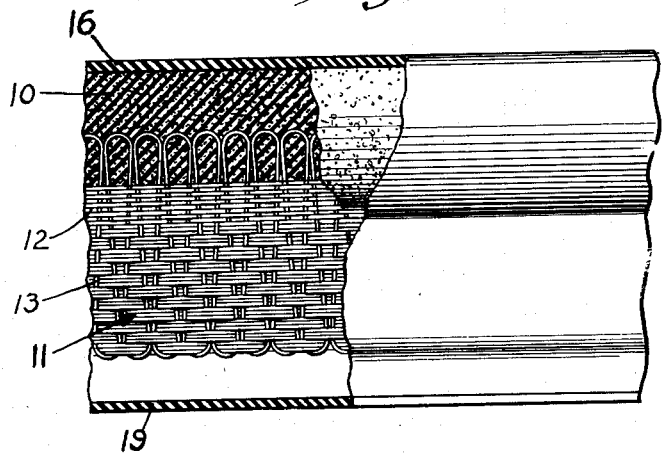
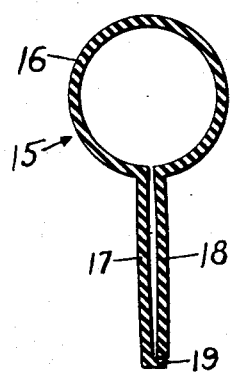
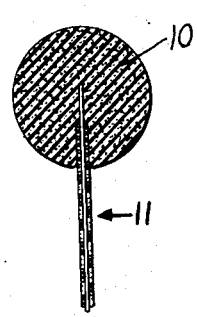
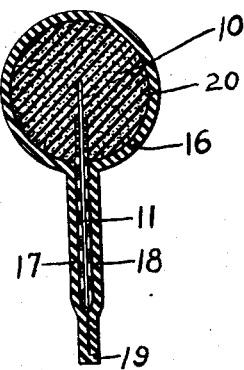
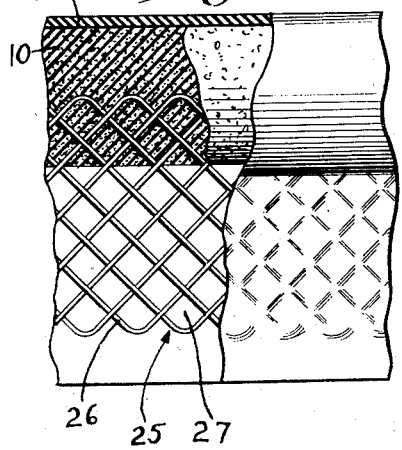
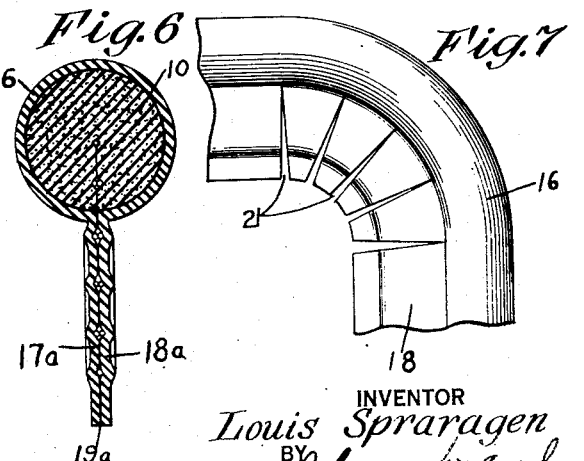
INVENTOR
Louis Spraragen
BY
ATTORNEYS Patented Oct. 27, 1942

2,299,955

UNITED STATES PATENT OFFICE 2,299,955

WEATHER STRIP AND METHOD OF MAKING THE SAME

Louis Spraragen, Bridgeport, Conn., assignor to Bridgeport Fabrics, Inc., Bridgeport, Conn., a corporation of Connecticut Application July 5, 1940, Serial No. 343,957

11 Claims. (Cl. 20—69)

This invention relates to a heavy-duty flexible weather strip or beading strip, and, more particularly, to a strip having a heavy covering of rubber secured therearound.

In prior constructions where a relatively heavy rubber covering was provided, it was formed by wrapping a sheet of rubber around the bead and securing it in place by stitching or otherwise. In wrapping the rubber about the bead, stresses were set up in the cover, which, upon working of the bead around a corner, caused the surface of the covered weather strip to buckle.

The present invention has overcome these difficulties by providing the cover as a preformed rubber element shaped to fit the exterior of the bead and attaching strip and adapted to be fitted thereover and secured thereto so that the cover, in its normal position, does not have any stresses therein.

In the preferred form of the invention, the cover is extruded or molded so that it has a circular portion adapted to fit around the bead of the weather strip and two integral flanges adapted to extend on either side of the attaching strip, which is secured to the bead, so as to enclose the entire bead and attaching strip in a rubber covering.

The present invention also provides a novel method of assembling these elements in the formation of the completed heavy-duty weather strip.

In this method both the cover and core are treated and assembled and then pressed together into a firm union.

According to the present invention, the attaching strips are preferably of resilient material. In one form of the invention, the strip comprises a woven fabric in which the warp is formed of textile material and the weft of spring wire. In another form of the invention, the attaching strip comprises braided spring wire securely anchored in place.

When the cover is pressed into sealing relation with the bead and attaching strip thereon, the cover becomes securely bonded to the bead and textile fibers of the warp threads and thus locked in place, or the portion of the cover extending on either side of the braided strip, when such is used, is pressed into engagement through the openings formed in the strip during the braiding thereof. This not only secures the cover in position, but also holds the wires of the braided strip against shifting with respect to one another.

The edges of the portion covering the attaching strip extend below the strip and are secured together so as to completely enclose the bead and attaching strip and seal it against moisture or foreign material.

In achieving this seal, according to one form of the invention, one of the portions covering the attaching strips extends below the other and has a projection extending transversely so as to form an abutment for the end of the other cover portion for the strip, thus making a complete closure for the strip.

In another form of the invention, the side cover portions are of equal length and the portions extending below the edge of the strip are pressed into intimate engagement to form the seal.

In the broad aspects of the present invention, I have provided a heavy-duty weather strip in which a thick cover of rubber or the like is provided for the weather-stripping, which cover is substantially free from strain and can be readily handled and worked so as to produce a smooth finished appearance when installed in the desired location around openings or the like.

Other features and advantages of the invention will be apparent from the specification and claims when considered in connection with the drawing, in which:

Figure 1 shows a side elevational view, partly in section, of one form of the invention.

Fig. 2 shows a transverse sectional view of the cover.

Fig. 3 shows a transverse sectional view of the bead and attaching strip.

Fig. 4 shows a transverse sectional view of the bead and attaching strip with the cover therearound.

Fig. 5 shows a side elevational view, partly in section, of another form of the invention.

Fig. 6 shows a longitudinal sectional view of the form of the invention shown in Fig. 5.

Fig. 7 shows the beading of the present invention being worked around a curve.

As is shown in Fig. 1 of the drawing, the present invention concerns the formation of a heavy-duty weather strip having a relatively thick rubber or the like covering thereon.

The weather strip, according to the present invention, comprises a bead 10 of sponge rubber or other similar beading material having a stiff attaching strip secured thereto to project therefrom. As illustrated in Fig. 3, the bead is circular in cross-section and the attaching strips extend for a substantial distance into the bead to be securely anchored therein. While the bead has been shown to be of circular cross-section, it is to be understood that it can have other cross-sectional shapes as desired.

In the form of the invention shown in Figs. 1 through 4, the stiffening strip comprises a woven fabric having fiber warps 12 and resilient wire weft members 13 passing through the warps, as is clearly shown in the broken-away section in Fig. 1.

The assembled bead and attaching strip, according to the present invention, are covered by a preformed relatively heavy cover 15 of rubber, synthetic rubber, or the like fluid-resistant material. This material should be impervious to water, oil or gases, as required, in order to provide the desired seal. The cover, which is shown in Fig. 2, is extruded, molded or otherwise preformed so that the portion 16 which surrounds the bead is of substantially the same shape as the external dimensions of the bead. Projecting from the portion 16 of the cover are flanges 17 and 18 integrally formed with the portion 16 so as to extend on either side of the attaching strip 11.

As is shown in Fig. 4, the flanges 17 and 18 extend below the edge of the attaching strips and are joined together to completely seal the bead and attaching strip.

In the form of the invention shown in Fig. 1, this seal is accomplished by extending the flange 17 slightly below the edge of the flange 18 and providing it with a transversely projecting extension 19 which abuts the end of the flange 18 and thus forms a seal.

When the cover is extruded or premolded into the desired shape, it will, of course, be free from stresses or strains therein which might occur through the bending of a sheet of rubber into the required form.

The cover is rigidly secured to the bead and attaching strip by cement or the like 20.

In making up the strip of the present invention, a novel method is employed. The core, herein illustrated as a sponge rubber bead having a woven attaching strip thereon, is formed. The cover is extruded to the desired shape, namely, the same shape as the exterior of the core.

The cover is prepared for assembly by having the inner surface thoroughly cleaned and roughened and a coating of rubber cement applied thereto and allowed to dry. If desired, other suitable adhesives may be used.

The core is passed through a bath of suitable binder or rubber cement and then through a squeezing means employing a pair of pressure rollers which squeeze the rubber cement into the core by the application of mechanical pressure and remove the excess cement.

The thus treated core is inserted into the prepared cover and pressure applied therearound to cause the cover to firmly adhere to the core.

When the weather strip is thus produced, the heavy rubber-like cover which surrounds the bead and attaching strip is substantially free of stress or strains and when it is desired to work the weather strip around corners in openings, it can be easily accomplished, for the rubber covering which is securely bonded to the core and attaching strip will yield, and, being unstressed, can be made to fit smoothly about the curves without buckling or undue creasing.

As is shown in Fig. 7, the attaching strip can be provided with a plurality of V-shaped notches 21 so that the weather strip can be readily carried around the corner of the opening and secured in place. When so positioned, the bead with its cover will readily bend and form a smooth sealing member extending around the opening.

In the form of the invention shown in Figs. 5 and 6, the attaching strip comprises a braided fabric of wire 25 in which the strands 26 of wire are passed across the strip in a substantial angle to the edge thereof and over and under the wires to provide a resilient attaching strip.

The wire thus braided will provide a large number of openings 27 in the strip between the wires. According to this form of the invention the braided attaching strip is secured to the bead so as to project therefrom as shown in Figs. 5 and 6. The cover is extruded or premolded to the desired shape and is then processed, as by roughening the inner surface and applying adhesive thereto as previously described, and is placed around the core and pressed into engagement therewith.

When the pressure is applied to secure the cover in place, the flanges 17a and 18a will be pressed through the openings in the wire braid and into engagement, as shown in Fig. 6, and become secured together. This not only seals the wire against moisture or other undesirable material, but it also holds the wires against lateral shifting movement. The ends of the flanges 17a and 18a are secured together in face to face relation, as shown at 19a, thereby providing a complete seal for the attaching strip.

In its broader aspects, the present invention provides for the enclosing of a bead or a core with a substantially heavy cover of rubber or the like, which cover is in an unstressed condition, and will readily bend to the desired shapes.

While it has been shown that the cover is closed by the securing together of the two flanges, it is to be understood that the opening, through which the bead and attaching strip is inserted, can be at any desired point so long as the cover remains undistorted and unstressed when in assembled position.

Further, if desired, the cover may be extruded onto the core which may or may not be previously treated and secured in place therearound during the vulcanization of the cover in order to completely enclose and seal the core. In carrying out this method, the core is first assembled, and, if it is to be treated, is covered with a compound to cause the rubber or the like to adhere thereto. The thus treated core is passed through an extruding machine or the like forming machine and the cover formed to the shape of the exterior of the core and directly upon the core, whereupon it adheres to the treated surface of the core.

Variations and modifications may be made within the scope of this invention and portions of the improvements may be used without others.

I claim:

1. A weather strip comprising a bead having a resilient attaching strip secured thereto to project therefrom; and a preformed rubber cover of substantially the same shape as the exterior of the bead and attaching strip, said cover being in an unstressed condition and completely enclosing said bead and attaching strip.

2. A weather strip comprising a bead having an attaching strip secured thereto to project therefrom; and a preformed rubber cover having a shape corresponding to the shape of the exterior of the bead, and a pair of flanges extending therefrom a greater distance than the attaching strip, said cover surrounding said bead and attaching strip and being secured thereto throughout the entire surface of the bead and strip and having the edges of the flanges secured together beyond the edge of the attaching strip to completely seal the same.

3. A weather strip comprising a bead having a resilient woven textile and wire-attaching strip secured thereto to project therefrom; and a preformed rubber cover of substantially the same shape as the exterior of the bead and attaching strip, said cover surrounding the bead and attaching strip and being secured in unstressed condition to the bead and woven fabric.

4. A weather strip comprising a bead having a resilient attaching strip of braided steel wire secured thereto to project therefrom, said strip having a plurality of openings formed along its length between the braided wires; and a preformed rubber cover of substantially the same shape as the exterior of the bead and attaching strip, said cover surrounding the bead and attached thereto and extending over the braided wire and being secured together through the openings in the braided strip to hold the wires in position and seal the same.

5. A weather strip comprising a bead, and a preformed cover of unstressed flexible rubber or the like material of substantially the same shape as the exterior of the bead and having a pair of flanges extending therefrom, said cover being secured to the bead throughout the entire surface thereof and the flanges being secured together to completely seal the same.

6. In the method of manufacturing a weather strip, the steps of forming a continuous core having at least a portion thereof of resilient flexible beading material; treating said core to cause rubber to adhere thereto; and passing said continuous core through an extruding means and extruding a cover of substantially the same shape as the exterior of the core directly on the treated surface of the core to adhere thereto.

7. In the method of manufacturing a weather strip, the steps of securing a sponge rubber bead to an attaching strip; treating the bead and attaching strip to cause rubber to adhere thereto; and passing the secured together bead and attaching strip through an extruding machine and extruding a relatively thick rubber cover of substantially the same shape as the exterior of the bead and attaching strip directly on the treated surface of the bead and attaching strip to adhere thereto.

8. A weather strip comprising a bead having a stiff attaching strip secured thereto to project therefrom; and a preformed rubber cover having a part substantially the same shape as the exterior of the bead and portions extending therefrom to overlie the attaching strip, said cover surrounding the said bead and extending over the attaching strip and being secured thereto in a substantially unstressed condition.

9. In the method of manufacturing a weather strip, the steps of forming a continuous core having at least a portion thereof of resilient flexible beading material; passing said continuous core through an extruding means and extruding a cover of substantially the same shape as the exterior of the core directly on the surface of the core to adhere thereto.

10. A weather strip comprising a bead having an attaching strip secured thereto to project therefrom, and a preformed resilient, flexible cover of substantially the same shape as the exterior of the bead and attaching strip, said cover being in an unstressed condition and of homogeneous, plastic fluid-resistant material to seal the bead and attaching strip against water, oil or gas.

11. A weather strip comprising a bead having an attaching strip secured thereto to project therefrom, and a preformed fluid-resistant cover of homogeneous, plastic material having substantially the same shape as the exterior of the bead and attaching strip, said cover being in an unstressed condition and completely enclosing said bead and attaching strip and being impervious to water, oil and gas to seal the same against entry thereof.

LOUIS SPRARAGEN.